US007831701B2

(12) United States Patent
Hu

(10) Patent No.: US 7,831,701 B2
(45) Date of Patent: Nov. 9, 2010

(54) CASCADING POLICY MANAGEMENT DEPLOYMENT ARCHITECTURE

(75) Inventor: Q. James Hu, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 458 days.

(21) Appl. No.: 11/925,835

(22) Filed: Oct. 27, 2007

(65) Prior Publication Data

US 2009/0113514 A1  Apr. 30, 2009

(51) Int. Cl.
 *G06F 15/16* (2006.01)
(52) U.S. Cl. .............. 709/223; 709/224; 709/227; 370/229
(58) Field of Classification Search .......... 709/223, 709/224, 227; 726/1; 370/229
See application file for complete search history.

(56) References Cited

U.S. PATENT DOCUMENTS 7,082,102 B1* 7/2006 Wright .............. 370/229
2004/0039803 A1* 2/2004 Law ................ 709/223
2005/0038887 A1* 2/2005 Cuervo et al. ........ 709/224
2007/0192823 A1* 8/2007 Andersen et al. ....... 726/1
2008/0244688 A1* 10/2008 McClain et al. ....... 726/1
2009/0089436 A1* 4/2009 Hurtta et al. ........ 709/227

* cited by examiner

*Primary Examiner*—Jinsong Hu
(74) *Attorney, Agent, or Firm*—Moazzam & Associates, LLC

(57) ABSTRACT

Systems and methods are provided to implement a dynamic and efficient cascading policy management framework architecture for both wired and wireless networks. A plurality of Policy Functions (PFs) are assigned to a plurality of Policy Enforcement Points (PEP). The PFs make decisions regarding local policy control at the specific PEP. The PFs then delegate the policy requests or IP flows to a separate PEP that is more conducive to enforcing that policy request. Thus, policy decisions are made at the point where the most information is available, leading to fewer policy requests traversing back and forth across a network. Additionally, this cascading Policy Management Framework Architecture allows for unified policy management across multiple types of networks, including wired (Internet) and wireless (UMTS).

21 Claims, 4 Drawing Sheets

CASCADING POLICY MANAGEMENT DEPLOYMENT ARCHITECTURE

BACKGROUND OF THE INVENTION

1. Field of the Invention

The present invention relates generally to telecommunication networks. Specifically, the present invention relates to policy management on telecommunication networks.

2. Background of the Invention

The evolution towards UMTS, HSPA, SIP/IP services and more powerful end-user devices is resulting in new application and service uses across mobile networks. VoIP, Slingbox, online gaming, Google Maps, etc. are examples of these services. This trend is also resulting in service providers becoming mere "bit pipes", or bandwidth providers. Thus there is a need for service providers to establish IT and business mechanisms to provide a well-managed quality-controlled secure experience. This will retain and enhance the customer base and facilitate convenient business deals with other service and content providers.

One such mechanism is Policy management. Policy management enables a service provider to proactively manage data service usage across the network. Policy management can be applied to manage subscriber access and usage, network resources, and application/media resources and services.

As mobile data networks converge with other packet-based data networks, such as cable internet, service providers need to consider the capabilities of policy management for integrated and converged services across their networks.

The emphasis and goals for existing policy management frameworks results in a specific approach to policy framework architectures, such as the radio resource constraint in the mobile network. For instance, in a mobile wireless network, e.g. UMTS, the goal of policy control is more focused on resource control and management. This leads to a centralized policy management framework relative to mobile network design standards. The policy enabled control mechanism is in the core of the network. See FIG. 3A.

The disadvantage of this architecture is that there is added complexity and delays between decisions and enforcement. An alternative policy management is more suited to IP and other decentralized networks. A goal in this type of network is to police incoming network traffic close to the edge of the network or intranet. The result is a more distributed policy management architecture (hereinafter "architecture"), see FIG. 3B.

This divergence of goals results in the divergence of standard work in the policy management area. The 3GPP R7 PCC takes a centralized approach to the design of the policy management architecture, thus placing policy control at the core of the network. In the TISPAN and DSL forums however, the policy decision and enforcement is more distributed and more control is placed at the edge of the network.

Support of services on converged networks supporting heterogeneous access technologies is an ongoing topic of discussion in various industry forums with no clear solutions at this time. No one forum so far has taken the responsibility for end to end systems encompassing different architectures that support different access technologies. Whereas interconnect gateways exist to connect multiple different networks, at present, very little has been done to converge these standards or to implement a standardized policy management framework that can transcend the network type and is ideal for an IMS environment.

SUMMARY OF THE INVENTION

The present invention provides systems and methods to deploy Policy Functions closest to where a decision needs to be made. A cascading policy function (PF) architecture is presented, wherein a plurality of PFs are chained and linked by a common interface. Primary PFs are distributed at the edges of the network, i.e. access gateways. Secondary PFs are placed where services are inter-connected or converged, i.e. interconnect gateways. In addition, there can be a third or higher-level PF for decisions that are global in nature.

At a point where a policy decision needs to be made, performance can be improved by incorporating a PF within that network element. In one exemplary embodiment, the present invention is a system wherein a PF communicates with a local policy database or a centralized policy database or a combination of the two. A Policy Enforcement Point (PEP) may also be included within the PF to enforce a policy decision. This PF may be limited to enforce policy decisions of a limited type. Where a higher function is requested or a higher policy needs to be enforced, this decision is delegated to a separate PF incorporated at the network element where that decision needs to be made. Thus, network load is balanced in a way similar to that of a fully distributed policy management framework described above, with the added benefit of more central or higher-level policy functions when needed.

This scaleable deployment architecture provides flexibility for both centralized and distributed requirements. This novel way of defining interface between PFs allows for cascading decision making as well as bottom-up decision making. This architecture thus provides efficiency and flexibility to unify both wireless and wire-line networks.

In another exemplary embodiment the present invention is a method to efficiently enforce policies in a network. A first Policy Function (PF) communicates with a Policy Database to determine whether a local policy or rule needs to be applied to an incoming request at a gateway or PEP. The first PF communicates with the PEP any rules that need to be enforced. Then the first PF determines whether or not a higher-level rule applies to the incoming request. If yes, the first PF submits the request to a second PF at a separate PEP where a second PF resides. The second PF determines any local rules, notifies the PEP, and subsequently submits the request to another PF if the need arises. Any PF may communicate with any other PF via DIAMETER or equivalent protocols. Policy decisions are enforced by the network element or PEP that is most suited to making that decision or that has the most available information. This information may be stored in a policy database or any other database. Thus, there are fewer overall requests traversing back and forth between network elements, saving network resources and offering a mobile operator with better control over services and applications.

DETAILED DESCRIPTION OF THE INVENTION

Figure 1:
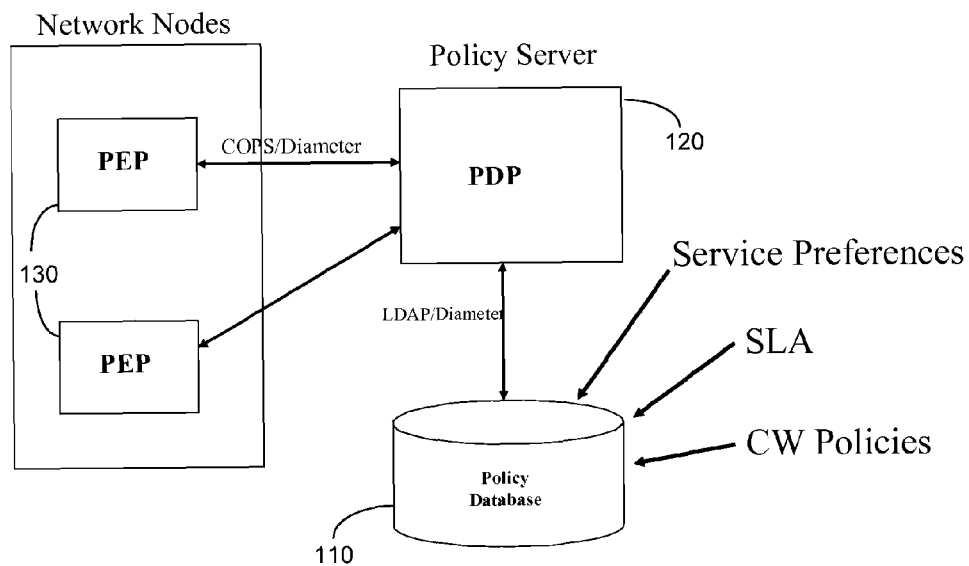
FIG. 1 shows a conventional Policy Management Framework.

The present invention provides systems and methods to deploy Policy Functions closest to where a decision needs to be made. To achieve this, the core elements of a policy management framework can be separated and deployed at appropriate points in the network. In one exemplary embodiment for multiple types of networks, every gateway to and from a network system incorporates a Policy Server comprising a Policy Decision Point (PDP), a Policy Enforcement Point (PEP), and a Policy Database (PD). Since these elements are separable and unique, they can be placed at points on the networks where the decisions need to be made and enforced. Furthermore, interconnectivity between the policy servers and databases allows for different levels of policy decision and enforcement to be delegated to different PDPs and PEPs along the network.

The present invention supports an IP Multimedia System (IMS) environment. IMS is an architectural framework for delivering internet protocol (IP) multimedia to mobile users. IMS eases integration with the Internet by using IETF (i.e. Internet) protocols such as Session Initiation Protocol (SIP). Since IMS was conceived, it is becoming increasingly easier to access content and contacts using mechanisms outside the control of traditional wireless/fixed operators. The Home Subscriber Server (HSS) is a master user database that supports the IMS network entities that actually handle calls. It contains the subscription-related information (user profiles), performs authentication and authorization of the user, and can provide information about the user's physical location. Thus, policy control at the HSS would typically be related to authentication and UE permissions/capabilities.

A Proxy-CSCF (P-CSCF) is a SIP proxy that is the first point of contact for the IMS terminal. Some networks may use a Session Border Controller (SBC) for this function. Since the P-CSCF authenticates the user and establishes an IPsec security association with the IMS terminal, it helps prevent spoofing attacks and replay attacks and protects the privacy of the user. A Policy Function (PF) can be paired with the P-CSCF to authorize resources and bandwidth management, etc. The PF can also be a separate function. A BGCF (Breakout Gateway Control Function) is a SIP server that includes routing functionality based on telephone numbers. It is commonly used when calling from the IMS to a phone in a circuit switched network, such as the Public Switched Telephone Network (PSTN) or the Public land mobile network (PLMN). According to one exemplary embodiment of the present invention, PFs are paired with the BGCF between two networks as well as intermediate PFs on a higher level. Application servers (AS) host and execute services as well as interface with the S-CSCF using Session Initiation Protocol (SIP). An AS can be located in the home network or in an external third-party network. The MRF (Media Resource Function) provides media related functions such as media manipulation (e.g. voice stream mixing) and playing of tones and announcements.

"Policy management" refers to any management paradigm/framework that uses policies to manage resources, processes, and underlying systems. The term "Policy Management" governs many areas including but not limited to Quality of Service (QoS), content filtering, differential charging, traffic flow control, converged services, roaming, etc. Policies can be applied based on a number of variables, such as applications, subscribers, time of day, etc. When combined with billing and charging rule sets, policy management enables differentiated charging functionality. Additionally, policy management allows real-time action to be taken on a subscriber's data flow, such as blocking services, filtering content, or monitoring QoS. A "policy-enabled service" (or "application") is one whose functional behavior is determined wholly or partially by policies. A "Policy Management Framework" (PMF) is a deployable framework that supports centralized management of policies for both services and network.

A "Policy" is a set of rules and instructions that determine the operations of systems and networks. Alternatively, it is "a set of rules to administer, manage, and control access to network resources [RFC3060]". A "policy function" (PF) is a logic unit that decides which policies to invoke and at what point in the system. A PF may comprise a Policy Decision Function (PDF) and/or a Policy Enforcement Function (PEF). A "Policy Rule" is a basic building block of a policy-based system. It is the binding of a set of actions to a set of conditions—where the conditions are evaluated to determine whether the actions are performed. For instance, a policy rule could follow the logic:

If (a set of policy conditions) then (a set of policy actions)

Policy Rules (or simply "Rules") can be related to the network. For instance, a rule could state that a "gold subscriber" gets 1.5 mpbs of bandwidth. Alternatively, Rules can be related to services. For example, if requesting a location of a mobile device, check if permission is given, or other user preferences.

Figure 2:
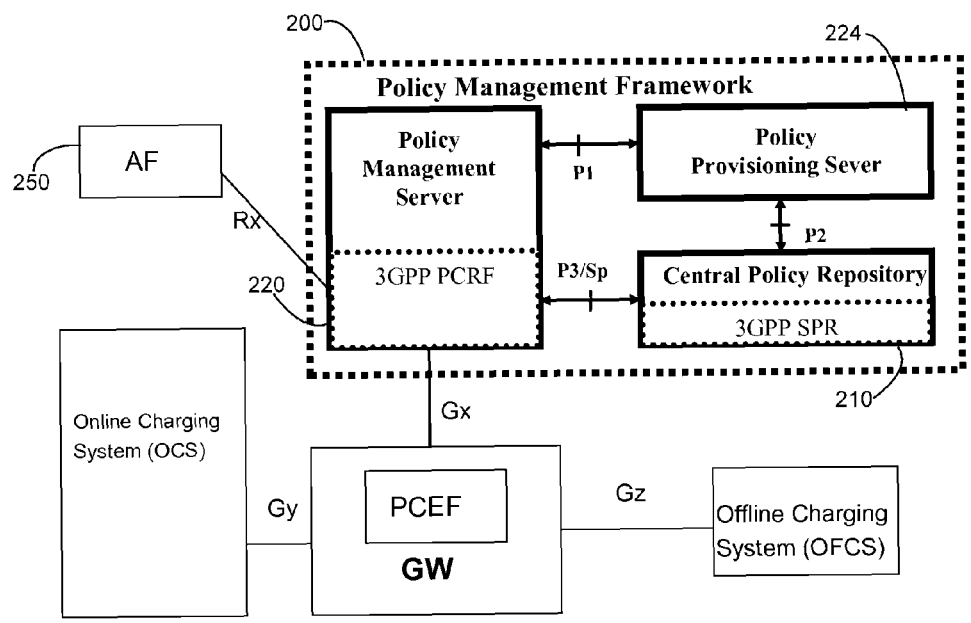
FIG. 2 shows a Policy Management Framework according to an exemplary embodiment of the present invention.

FIGS. 1 and 2 show a basic and conventional Policy Control Architecture as compared to the framework as applied to the present invention. In FIG. 1, there are 3 basic elements: a Policy Database (PD) 110, a Policy Decision Point (PDP) or Policy Function (PF) 120, and a Policy Enforcement Point (PEP) 130. PEP 130 is a logical entity that enforces policy decisions. When a Policy Decision needs to be made at PEP 130, a request is submitted to PDP 120. PDP 120 checks the PD 110 and makes a decision and responds to PEP 130.

FIG. 2 shows an exemplary embodiment of a policy function 200 as applied to the present invention. A policy management server (PMS) 220 acts as a Policy Function for both IP flow based and non-IP flow based services. PMS can also act as a policy manager that manages predefined network operator policies, policy conflict resolution, and policy precedence setting. Some of these functions can also be offloaded to a Policy Provisioning Server (PPS) 224 per deployment requirements. PPS 224 is responsible for policy provisioning (including syntax check, policy parsing, and cataloging), policy validation, policy based access control, and SLA management. PPS 224 is a logical entity that provides a single entry point for provisioning policies. It also provides other additional policy management functions as needed, thus meeting the flexibility requirement. Central policy repository 210 (could be the SPR in 3GPP standard or other deployed subscriber or Policy databases) stores all policy data. This centralized policy related data storage is a useful requirement for the PMF 200 to help operators reduce operating costs while increasing policy management efficiency. The AF 250 (application function, for instance P-CSCF) is the element that offers dynamic policy and charging control over the user plane behavior. It communicates with PCRF to transfer dynamic session information. This is the mechanism for dynamic application/session based policy control. There are three standard interfaces being defined by 3GPP: Rx 261, Gx 262, and Sp 263 currently specified in 3GPP stage 3 documents (TS 29.212, TS 29.213, and TS 29.214)

Figure 3A:
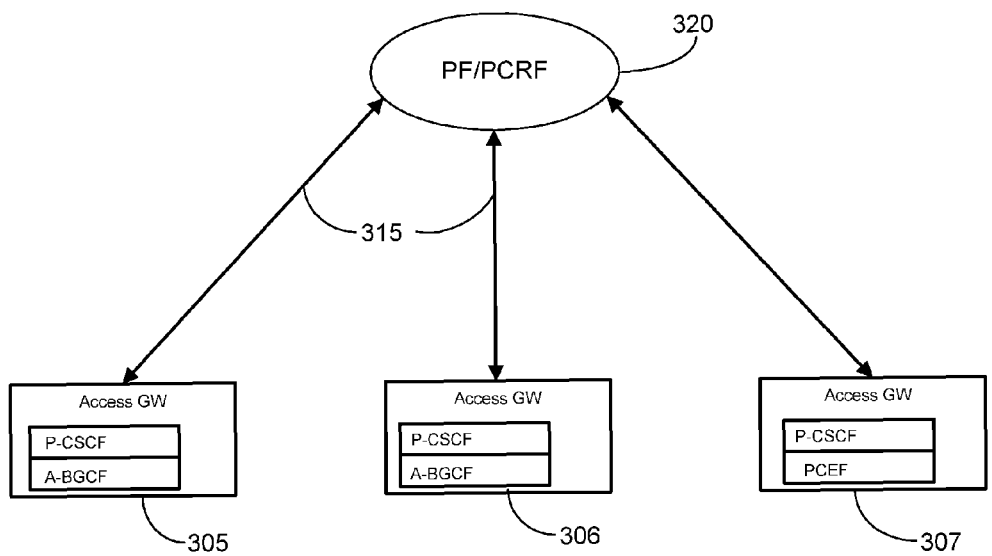
FIG. 3A shows a conventional centralized Policy Management Framework.
Figure 3B:
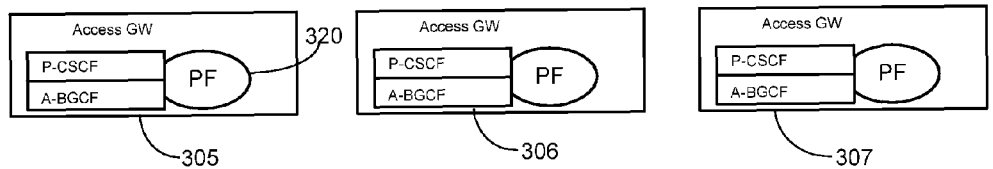
FIG. 3B shows a distributed Policy Management Framework.

FIGS. 3A and 3B show existing approaches to Policy Management Framework Architecture. FIG. 3A shows an approach wherein the policy functions are centralized as in a mobile wireless network, e.g. UMTS. Every time a UE encounters a gateway 305-307, a Policy Request is submitted 315 to PF 320. PF 320 makes decisions on necessary policies, and informs the gateways 305-307, where the policies are to be enforced. The policy decision is centralized by extracting it from the gateway or enforcement functions. Thus the policy control mechanism is unified. This is ideal for networks where applications and resources are placed centrally. In such a network, the goal of policy control is more focused on resource control and management. This leads to a centralized policy management framework relative to mobile network design standards. The policy enabled control mechanism is in the core of the network.

One of the disadvantages of this architecture is that there is added complexity and delays between decisions and enforcement. Every policy decision, even those that only need to be made locally, traverses the network to get to the sole PF 320. Thus, unnecessary traffic is generated in both directions between network elements. An alternative policy management is more suited to IP and other decentralized networks. A goal in this type of network is to police incoming network traffic close to the edge of the network or intranet. The result is a more distributed policy management architecture (hereinafter "architecture"). FIG. 3B shows this approach. A PF 320 is incorporated within every gateway and/or enforcement element 305-307. Thus, the architecture is totally distributed. This is ideal for situations where most policy decisions are local, with the goal of enforcing traffic quicker and earlier. Thus this distributed architecture limits undesirable traffic to the edge of the network, reducing traffic and costs.

Figure 4:
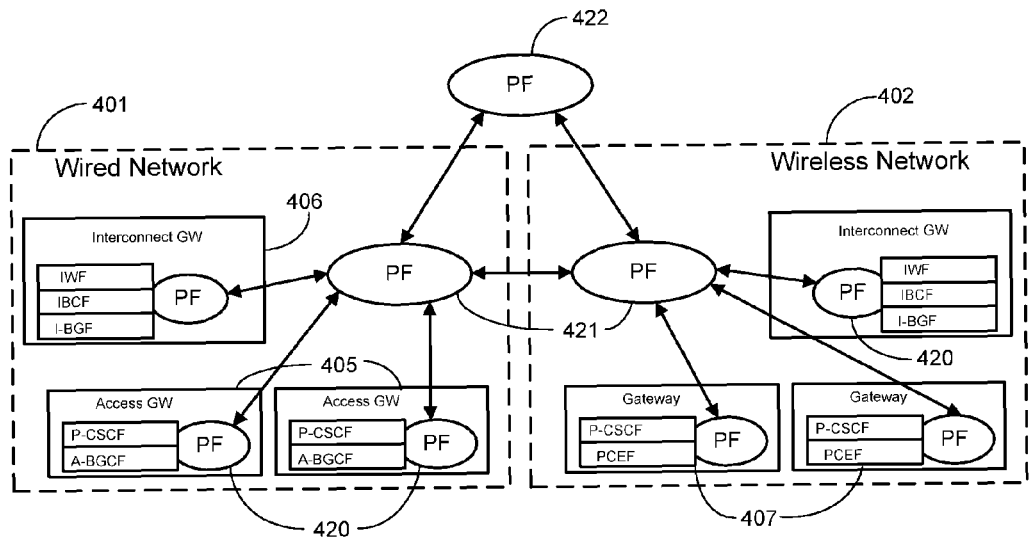
FIG. 4 shows a Policy Management Framework according to an exemplary embodiment of the present invention.

An exemplary embodiment of the present invention provides a highly flexible architecture that may be deployed as shown in FIG. 4. A wired network 401 and a wireless network 402 exist within an IMS environment. Within wired network 401 reside multiple gateways, including Access Gateways 405 connecting UE or other devices to the network, and Interconnect Gateways 406 that interface with other network and service providers. Similarly, within wireless network 402 reside Gateways 407 connected to mobile devices and Interconnect Gateway 408 to interface with other networks. Every gateway 405-408 is provided with a lower policy function PF 420. These PFs are in communication with intermediate policy functions PFs 421, and possibly with third or more upper-level PFs 422. Each policy function may also have access to a local cache/database at each outer point. This includes subsets of a more centralized database.

In one exemplary embodiment, upper-level or higher PF 422 resides in an IMS environment and is in communication with PFs 420 and 421 on both wired 401 and wireless 402 networks. Other configurations of converged networks will be apparent to one having ordinary skill in the art.

When a UE requests an application, service, or media resource, the UE may traverse access gateway 405. At this point, PF 420 kicks in to determine whether or not a local policy or rule exists for the incoming request. PF 420 refers to a Policy Database (not shown), and applies any local rules. For instance, the UE may be requesting access to a multimedia resource via a gateway. Local PF 420 may apply a rule determining whether or not UE has access to the network itself. Alternatively, UE may be a roaming subscriber and thus traverse Interconnect Gateway 408. PF 420 would then determine whether or not the roaming subscriber has privileges to access the local network. In either case, if a local rule is to be applied, that point in the network is the PEP which enforces the rule as per instructions given by PF 420.

There may be policies that PF 420 is not authorized to decide. For instance, to determine whether or not UE has access to a particular multimedia resource, the appropriate PEP would be an application server. This application server may be coupled with a higher PF 421. PF 421, as described before, is in communication with other higher PFs on other networks, as well as top-level PF 422. PF 421 may enforce a local policy involving access to a particular media resource. However, another embodiment may involve a network where for instance a uniform Billing System is being used to bill subscribers of both wired and wireless networks. In this situation, a billing verification request may be in order. Application Server PF 421 may not be the most appropriate point to enforce such a policy. In this case, PF 421 can communicate the request to upper-level PF 422 that may be coupled with a billing server. Upper level PF 422 may alternatively be an independent unit within the network and may delegate policy tasks to existing policy functions in other service environments.

All policy functions 420-422 may have access to a centralized user database wherein each user has a set of policies applied towards them. Alternatively, each PF may have access to a cache of such centralized database, with more specialized policy decisions being delegated to PFs at a PEP that has access to information beyond the basic database, such as application usage or billing history. Additional configurations will be apparent.

Figure 5:
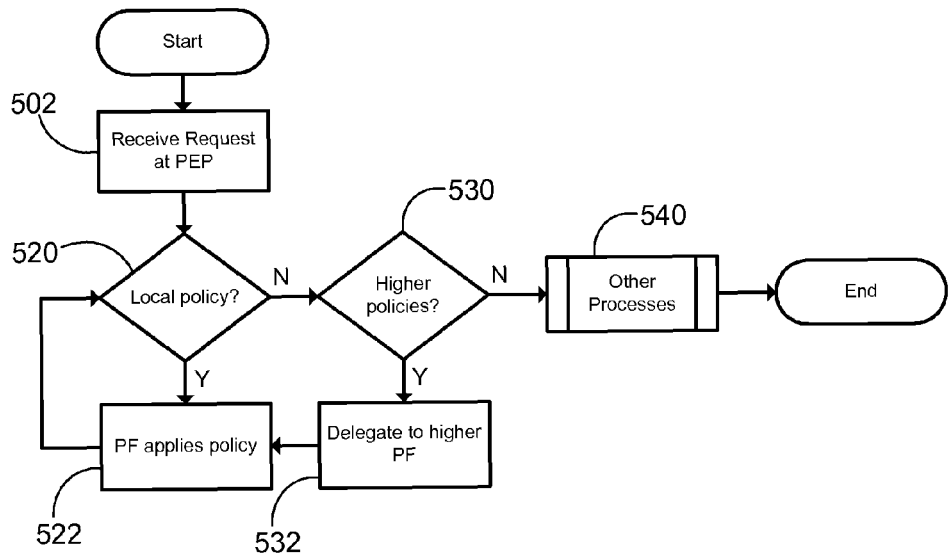
FIG. 5 shows a method for Policy Enforcement according to an exemplary embodiment of the present invention.

FIG. 5 shows a process according to an exemplary embodiment of the present invention. PEP receives a request 502 from a UE. In one embodiment, the PEP may reside within a gateway between two networks, such as a GGSN. The UE may be a user device, such as a mobile phone. The request may be a request by the UE to access a particular resource on the network, such as an application on an AS. The PF at this point 520 checks a rule database to determine whether or not a policy is to be enforced at that PEP. If the appropriate conditions are satisfied, then a local policy may be applicable 522. More than one policy may be applicable. In this embodiment, since the request is to access a network resource, a local policy may exist regarding the UE's eligibility to communicate with network components. Examples of such policies include the UE device capabilities, account type, and authentication. For instance, if UE device is incapable of receiving packets at a particular speed, then the gateway will enforce a bandwidth limit. Alternatively, the gateway may have access to a central subscriber database (or any other database containing subscriber information). The PF could then enforce local policies 522 depending on whether or not the subscriber meets certain requirements. For instance, if the subscriber owns a high-speed device and has purchased additional bandwidth, then a broader channel will be opened to the network.

The PF applies every local policy until there are none left. The PF then determines 530 from the rule database whether or not there exist policies that can be delegated 532 to another PF or at another PEP. The other PEP may be at some point in the local network, or may transcend one or more networks. For instance, the request to traverse the network may be to access a particular application or media resource. The better suited PEP for this request would be the application server or media resource controlling the service. A PF resides at this higher application level. The PF at the higher-level PEP (higher PF) may confirm with a separate local rule database whether or not this or any other higher policy applies. In this instance, the local (higher) policy may deny or grant the UE access to the resource/service only if they qualify for the service. This can be determined by checking a local database or a central database. For instance, if the UE account is authorized to access the resource then access will be granted by the PF at the application server.

After the requisite local policies have been applied 522, this higher PF again checks if any even higher-level policies are to be applied 530. If so, then the policies are delegated to the PF at the appropriate PEP. If not, then the request is subjected to other processes 540 beyond the scope of the policy management framework. In one embodiment, a PF may reside on a converged network such that the PF on a wireless network is in communication with other PFs on a wireline network. For instance, a PF may reside on a GGSN on a UMTS network, but may be in direct communication with a PF residing at a web-based media server, such as iTunes™. The PF may submit an authentication request to the media server, which may in turn submit a credit check request to a separate Billing server. Other PF and PEP configurations will be apparent.

Figure 6:
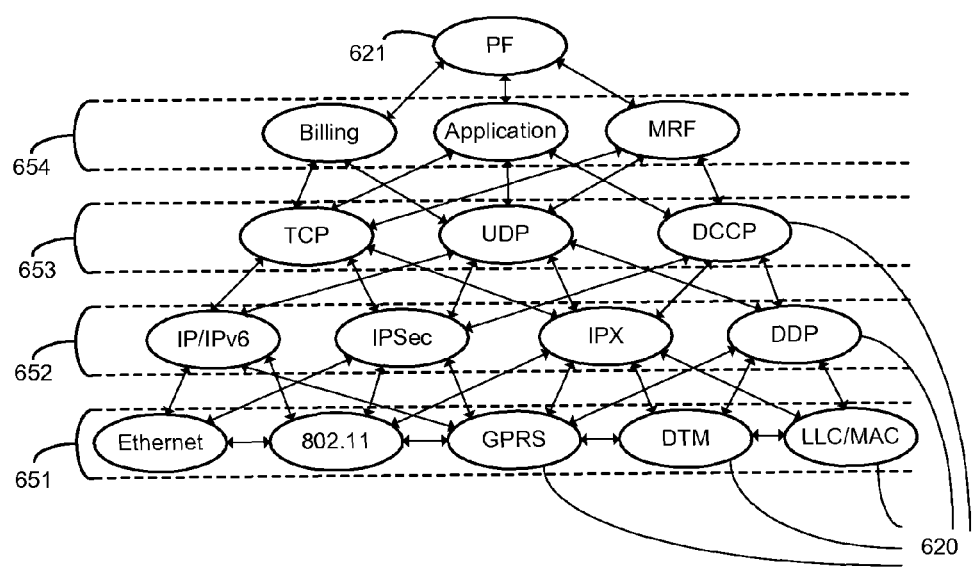
FIG. 6 shows a multi-layered interaction between cascading Policy Functions according to an exemplary embodiment of the present invention.

FIG. 6 shows a plurality of cascading PFs interacting within a multi-layered network. Each of layers 651-654 comprises a plurality of protocols/services, where each protocol/service is coupled with a PF 620. The oval 620 represents the PF. Layers 651-654 may be within the OSI model or the TCP/IP model. Data link layer 651, network layer 652, transport layer 653, and application layer 654 are shown. Some layers are not shown for clarity. However, the underlying concept should be apparent: every separate PF 620 is in communication with each other and the PFs in the level above it. Policy decisions regarding data layers are enforced locally, and other policies are submitted to the next level, until reaching the application layer. The top layer PF 621 is optional, and may comprise a central PF that monitors all the PFs below it and undertakes dispute resolution between policies. All PFs are in communication with one or more policy databases (not shown).

The policy management framework shown in FIG. 2 included a PPS. This provisioning server is ideally ubiquitous across every PF in the network. The PPS will provide security and access control functions for policy provisioning and can manage predefined operator policies that are unknown to the PCRF. Policy-based access control can be based on policy domains (customers, enterprises, and internal provider policies). In one exemplary embodiment, all provisioning can be done via a single user interface having access to various PFs at various points in the network. As described before, a policy database may be a single central user database or may exist as subsets within each PF.

The presented Policy Management Framework will integrate different policies existing in a network into a unified and open standard framework to reduce cost and increase efficiency. The combination of the unified and distributed framework further coordinates policy decisions & conflict resolution from an end-to-end perspective across all enforcement points.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A Policy Management Framework Architecture system, comprising:
   a first Policy Enforcement Point on a server in a network;
   a first Policy Function on the server in communication with the first Policy Enforcement Point, wherein the first Policy Function applies a first local Policy Rule to the first Policy Enforcement Point;
   a second Policy Enforcement Point on a server in a network in communication with the first Policy Function;
   a second Policy Function on the server in communication with the second Policy Enforcement Point; wherein the second Policy Function applies a second local Policy Rule to the second Policy Enforcement Point;
   a Policy Database comprising the first and second local Policy Rules and accessible by the first and second Policy Functions; wherein the Policy Database determines whether or not a Policy Request is to be enforced at the first Policy Enforcement Point or submitted to the second Policy Enforcement Point; and
   a Policy Provisioning Server which provides a single access point to the first and second Policy Functions.

2. The system of claim 1, wherein the Policy Enforcement Points reside within a data gateway such as Gateway GPRS Support Node (GGSN).

3. The system of claim 1, wherein the Policy Enforcement Points reside within an Application Server.

4. The system of claim 1, wherein the Policy Functions communicate with each other using a Session Initiation Protocol.

5. The system of claim 1, wherein the Policy Functions communicate with each other using the DIAMETER protocol or equivalents thereof.

6. The system of claim 1, wherein the Policy Functions support both IP and non-IP traffic flows.

7. A network system, comprising:
   a plurality of Policy Enforcement Points on the network;
   a plurality of Policy Functions in communication with each other and with the plurality of Policy Enforcement Points;
   a database containing a plurality of Policy Rules;
   a Policy Provisioning Server providing a single point of access to the plurality of Policy Enforcement Points; and
   a Policy Database comprising a logic process that determines which of the plurality of Policy Functions have to enforce the plurality of Policy Rules, wherein the Policy Database determines whether or not a Policy Request is to be enforced at a first Policy Enforcement Point of the plurality of Policy Enforcement Points or submitted to a second Policy Enforcement Point of the plurality of Policy Enforcement Points.

8. The network system of claim 7, wherein the logic process resides within the database containing the plurality of Policy Rules.

9. The network system of claim 7, wherein the logic process resides within the plurality of Policy Functions.

10. The network system of claim 7, wherein the Policy Enforcement Points reside within a network gateway such as a Gateway GPRS Support Node (GGSN) or Interconnect Gateway.

11. The network system of claim 7, wherein the Policy Enforcement Points reside within an Application Server.

12. The network system of claim 7, wherein the plurality of Policy Functions communicate with each other using a Session Initiation Protocol.

13. The network system of claim 7, wherein the plurality of Policy Functions communicate with each other using the DIAMETER protocol or equivalents thereof.

14. The network system of claim 7, wherein the plurality of Policy Functions supports both IP and non-IP traffic flows.

15. A method for efficient policy enforcement, comprising the steps of:
  determining at a first Policy Enforcement Point on a network whether or not a Policy Decision is to be made on a Policy Request, the first Policy Enforcement Point having a first Policy Function which applies a first Policy Rule to the first Policy Enforcement Point;
  enforcing a Policy Decision if the Policy Request matches the first Policy Rule, wherein the first Policy Rule resides on a Policy Database on the network;
  referring to a second Policy Rule on the Policy Database in determining whether or not to submit the Policy Request to a second Policy Enforcement Point on the network, the second Policy Enforcement Point having a second Policy Function which applies a second Policy Rule to the second Policy Enforcement Point;
  determining whether or not to submit the Policy Request to the second Policy Enforcement Point, wherein the Policy Database determines whether or not the Policy Request is to be enforced at the first Policy Enforcement Point or submitted to the second Policy Enforcement Point; and
  providing a single access point to the first and second Policy Functions at a Policy Provisioning Server on the network.

16. The method of claim 15, wherein the Policy Enforcement Points reside within a network gateway such as a Gateway GPRS Support Node (GGSN) or Interconnect Gateway.

17. The method of claim 15, wherein the Policy Enforcement Points reside within an Application Server.

18. A method for improved policy management within a communications network architecture, the method stored on a given network server and comprising the steps of
  receiving a Policy Request at a first Policy Enforcement Point in the network, said first Policy Enforcement Point residing on a first network gateway on a first server;
  communicating the Policy Request to a first Policy Function also residing on the first network gateway, wherein the first Policy Function applies a first local Policy Rule to the first Policy Enforcement Point;
  providing a Policy Database;
  referring to the Policy Database to determine whether or not the Policy Request is to be enforced at the first network gateway;
  referring to the Policy Database to determine whether or not the Policy Request is to be submitted to a second Policy Enforcement Point in the network to be decided by a second Policy Function; wherein the second Policy Function applies a second local Policy Rule to the second Policy Enforcement Point; wherein the second Policy Enforcement Point and second Policy Function reside on a second network gateway; and
  providing a single access point to the first and second Policy Functions at a Policy Provisioning Server on the network.

19. The method of claim 18, wherein the plurality of Policy Functions communicate with each other using a Session Initiation Protocol.

20. The method of claim 18, wherein the plurality of Policy Functions communicate with each other using DIAMETER or any equivalent protocol.

21. The method of claim 18, wherein the Policy Functions support both IP and non-IP traffic flows.

* * * * *